(12) United States Patent
Zhou

(10) Patent No.: US 8,801,263 B2
(45) Date of Patent: Aug. 12, 2014

(54) BACKPLATE AND BACKLIGHT MODULE COMPRISING THE SAME

(75) Inventor: Ge-Ge Zhou, Shenzhen (CN)

(73) Assignee: Shenzhen China Star Optoelectronics Technology Co., Ltd., Shenzhen, Guangdong Province (CN)

( * ) Notice: Subject to any disclaimer, the term of this patent is extended or adjusted under 35 U.S.C. 154(b) by 231 days.

(21) Appl. No.: 13/380,855

(22) PCT Filed: Dec. 15, 2011

(86) PCT No.: PCT/CN2011/084032
§ 371 (c)(1),
(2), (4) Date: Dec. 25, 2011

(87) PCT Pub. No.: WO2013/086715
PCT Pub. Date: Jun. 20, 2013

(65) Prior Publication Data
US 2013/0148379 A1 Jun. 13, 2013

(30) Foreign Application Priority Data
Dec. 13, 2011 (CN) .......................... 2011 1 0415470

(51) Int. Cl.
*F21V 7/04* (2006.01)
(52) U.S. Cl.
USPC ........... 362/632; 362/615; 362/621; 362/633; 362/634
(58) Field of Classification Search
USPC .......... 362/611, 613, 615, 621, 623, 632–634
See application file for complete search history.

(56) References Cited

U.S. PATENT DOCUMENTS

| 2008/0106915 A1 | 5/2008 | Okuda |
| 2011/0292317 A1 | 12/2011 | Kim et al. |
| 2012/0170311 A1* | 7/2012 | Huang et al. ................... 362/611 |

FOREIGN PATENT DOCUMENTS

| CN | 1515934 A | 7/2004 |
| CN | 1532604 A | 9/2004 |
| CN | 2888477 Y | 4/2007 |
| CN | 102141222 A | 8/2011 |
| JP | 2006-18037 A | 1/2006 |
| JP | 2011-21069 A | 2/2011 |

* cited by examiner

*Primary Examiner* — Meghan Dunwiddie
(74) *Attorney, Agent, or Firm* — Cheng-Ju Chiang

(57) ABSTRACT

A backlight module comprises a light guide plate, at least one light source and a backplate. The backplate comprises a baseplate, four side plates and at least one bridging structure. The backplate is used for supporting the light guide plate, and the side plates are disposed perpendicular to the baseplate respectively to form a receiving space for receiving the light guide plate. The at least one bridging structure extends inwards from an inner surface of the side plates by a certain distance to support and locate the at least one light source and the light guide plate. According to the present disclosure, because at least one bridging structure for supporting the light source is disposed on the side plate of the backplate, use of the heat dissipating aluminum extruded piece can be eliminated to reduce the cost; and furthermore, the at least one bridging structure can be used to accurately fix the positions of the light source and the light guide plate relative to each other, so the light coupling efficiency is relatively high.

15 Claims, 3 Drawing Sheets

BACKPLATE AND BACKLIGHT MODULE COMPRISING THE SAME

FIELD OF THE INVENTION

The present disclosure generally relates to the field of displaying technologies, and more particularly, to a backplate for use in a liquid crystal display (LCD) device and a backlight module comprising the backplate.

BACKGROUND OF THE INVENTION

Owing to their advantages such as lightweight, thin-profile, energy-saving, and no radiation, flat panel display devices such as liquid crystal display (LCD) devices have gradually replaced the conventional cathode ray tube (CRT) display devices as the mainstream display products. Currently, the LCD devices have found wide applications in various electronic apparatuses including digital TV sets, computers, personal digital assistants (PDAs), mobile phones and digital cameras.

Because an LCD panel does not emit light by itself, generally a backlight module must be disposed beneath the LCD panel to provide an area light source necessary for the LCD panel so that adequate brightness and an adequate contrast ratio are obtained to achieve the displaying function of the LCD device.

FIG. 1 is a schematic cross-sectional view of a conventional backlight module. As shown in FIG. 1, the conventional backlight module 100 comprises a backplate 110, a reflective sheet 120, a light guide plate 130, a light source 140 and a heat dissipating aluminum extruded piece 150. The backplate 110 comprises a baseplate 111, four side plates 112, and four connecting portions 113 for connecting the baseplate 111 with a corresponding one of the side plates 112 respectively. The reflective sheet 120 and the light guide plate 130 are disposed on the baseplate 111 in sequence. The light source 140 is disposed opposite to the light guide plate 130 so that light emitted by the light source 140 is guided into the light guide plate 130 to be transformed into an area light source. Additionally, the heat dissipating aluminum extruded piece 150 is disposed between the light source 140 and the backplate 110 to dissipate heat generated by the light source 140 and to fix the light source 140, and portions of the heat dissipating aluminum extruded piece 150 may also be used to support the reflective sheet 120 and the light guide plate 130.

However, the heat dissipating aluminum extruded piece 150 is relatively costly, and is unable to fix positions of the light source 140 and the light guide plate 130 relative to each other accurately, which leads to a low light coupling efficiency. Moreover, owing to advancement of the light source packaging technologies and improvement of performance of thermally conductive materials, it becomes unnecessary to dispose the heat dissipating aluminum extruded piece 150 in order to dissipate heat generated by the light source 140. Accordingly, an urgent need exists in the art to provide a novel backlight module structure that can solve this problem.

SUMMARY OF THE INVENTION

An objective of the present disclosure is to provide a backplate and a backlight module, which have a low cost but a high light coupling efficiency.

To achieve the aforesaid objective, the present disclosure provides a backplate for use in a backlight module. The backplate comprises a baseplate for supporting a light guide plate; four side plates, being disposed perpendicular to the baseplate respectively to form a receiving space for receiving the light guide plate; and at least one bridging structure, extending inwards from an inner surface of the side plates by a certain distance. The at least one bridging structure is movably connected with the side plates to support and locate at least one light source and the light guide plate, the at least one bridging structure is a polyhedral three-dimensional (3D) structure protruding outwards, and an upper surface of the at least one bridging structure adjoining the at least one light source and the light guide plate is a planar surface.

Preferably, the baseplate is at a higher level than a lower edge of each of the side plates, and an upper surface of the baseplate is within a same horizontal plane as the upper surface of the at least one bridging structure.

Preferably, the backplate further comprises four connecting portions, each of which is disposed between the baseplate and a corresponding one of the side plates respectively to connect the baseplate and the corresponding one of the side plates.

Preferably, the baseplate, the connecting portions, the side plates and the at least one bridging structure are integrally formed.

The present disclosure further provides a backplate for use in a backlight module. The backplate comprises a baseplate, four side plates, and at least one bridging structure. The baseplate is used for supporting a light guide plate, and the side plates are disposed perpendicular to the baseplate respectively to form a receiving space for receiving the light guide plate. The at least one bridging structure extends inwards from an inner surface of the side plates by a certain distance to support and locate at least one light source and the light guide plate.

Preferably, the at least one bridging structure is a polyhedral 3D structure protruding outwards, and an upper surface of the at least one bridging structure adjoining the at least one light source and the light guide plate is a planar surface.

Preferably, the baseplate is at a higher level than a lower edge of each of the side plates, and an upper surface of the baseplate is within a same horizontal plane as the upper surface of the at least one bridging structure.

Preferably, the backplate further comprises four connecting portions, each of which is disposed between the baseplate and a corresponding one of the side plates respectively to connect the baseplate and the corresponding one of the side plates.

Preferably, the baseplate, the connecting portions, the side plates and the at least one bridging structure are integrally formed.

Preferably, the upper surface of the at least one bridging structure is a rough surface.

Preferably, the upper surface of the at least one bridging structure is formed with micro-structures or with groove structures recessed inwards to better fix the at least one light source and the light guide plate.

Preferably, the at least one bridging structure is movably connected with the side plates to support different combinations of specific light guide plates and light sources having different characteristics.

The present disclosure further provides a backlight module, which comprises a light guide plate, at least one light source, and a backplate. The backplate comprises a baseplate, four side plates, and at least one bridging structure. The baseplate is used for supporting the light guide plate, and the side plates are disposed perpendicular to the baseplate respectively to form a receiving space for receiving the light guide plate. The at least one bridging structure extends inwards from an inner surface of the side plates by a certain distance to support and locate the at least one light source and the light guide plate.

Preferably, the light guide plate comprises a light incident surface, and the at least one bridging structure is disposed on one of the side plates that directly faces the light incident surface to support the at least one light source.

Preferably, the light guide plate comprises a plurality of light incident surfaces, the backlight module comprises a plurality of light sources, and the backplate comprises a plurality of bridging structures each of which is disposed on the side plates that directly face the light incident surfaces of the light guide plate to support the light sources respectively.

Preferably, the at least one bridging structure is a polyhedral 3D structure protruding outwards, and an upper surface of the at least one bridging structure adjoining the at least one light source and the light guide plate is a planar surface.

Preferably, the upper surface of the at least one bridging structure is a rough surface.

Preferably, the upper surface of the at least one bridging structure is formed with micro-structures or with groove structures recessed inwards to better fix the at least one light source and the light guide plate.

Preferably, the baseplate is at a higher level than a lower edge of each of the side plates, and an upper surface of the baseplate is within a same horizontal plane as the upper surface of the at least one bridging structure.

Preferably, the backplate further comprises four connecting portions, each of which is disposed between the baseplate and a corresponding one of the side plates respectively to connect the baseplate and the corresponding one of the side plates.

According to the backplate and the backlight module of the present disclosure, at least one bridging structure for supporting the light source is disposed on the side plate(s) of the backplate, so use of the heat dissipating aluminum extruded piece can be eliminated to reduce the cost; and furthermore, the at least one bridging structure can be used to accurately fix the positions of the light source and the light guide plate relative to each other, so the light coupling efficiency is relatively high.

What described above is only a summary of the present disclosure. In order to provide a better understanding of the technical solutions of the present disclosure so that the present disclosure can be practiced according to disclosures of this specification and in order to make the aforesaid and other objectives, features and advantages of the present disclosure more apparent, preferred embodiments of the present disclosure will be described hereinafter with reference to the attached drawings.

BRIEF DESCRIPTION OF THE DRAWINGS

In order to more clearly describe the technical solutions of the embodiments of the present disclosure, attached drawings to be used in the detailed description of the disclosure will be briefly described hereinbelow. Obviously, the attached drawings described hereinbelow only illustrate some of the embodiments of the present disclosure, and those of ordinary skill in the art can also obtain other attached drawings therefrom without the need of making inventive efforts, wherein.

DETAILED DESCRIPTION OF THE INVENTION

Figure 1:
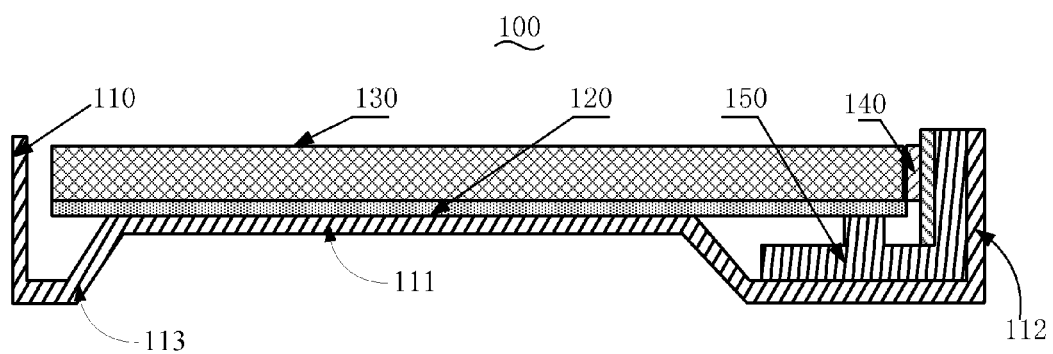
FIG. 1 is a schematic cross-sectional view of a conventional backlight module.

Various embodiments of the disclosure are now described in detail. Referring to the drawings, like numbers indicate like parts throughout the views. As used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise.

In order to further describe the technical solutions adopted to achieve the objectives of the present disclosure and the efficacies thereof, implementations, methods, steps, structures, features and efficacies of the color flat display panel and the corresponding color flat display device according to the present disclosure will be detailed hereinbelow with reference to the attached drawings and preferred embodiments thereof. The aforesaid and other technical disclosures, features and efficacies of the present disclosure will become apparent from the following detailed description of the preferred embodiments that is made with reference to the attached drawings. The technical solutions and the efficacies thereof will be better understood by those of ordinary skill in the art upon reviewing the following description. However, the attached drawings are only provided for illustration purpose but not to limit the present disclosure.

Figure 2:
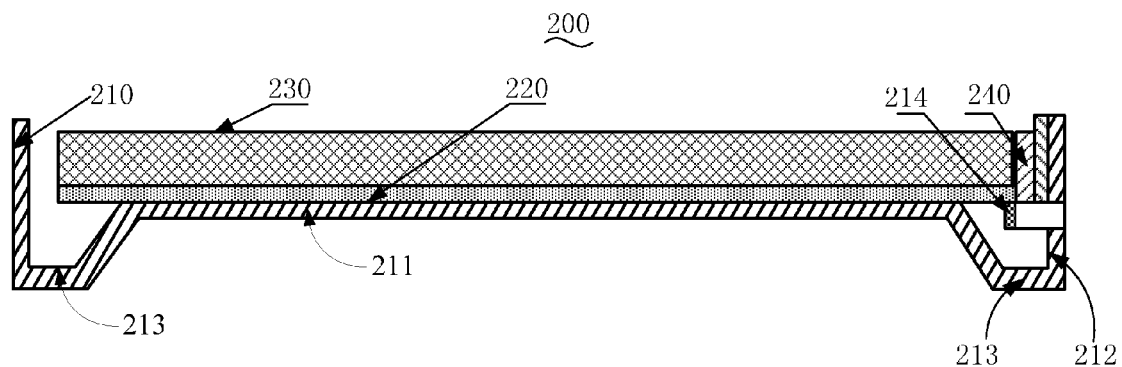
FIG. 2 is a schematic cross-sectional view of a backlight module according to a preferred embodiment of the present disclosure.

FIG. 2 is a schematic cross-sectional view of a backlight module according to a preferred embodiment of the present disclosure. As shown in FIG. 2, the backlight module 200 of the present disclosure comprises a backplate 210, a reflective sheet 220, a light guide plate 230, and at least one light source 240. The reflective sheet 220 and the light guide plate 230 are disposed on the backplate 210 in sequence.

Figure 3:
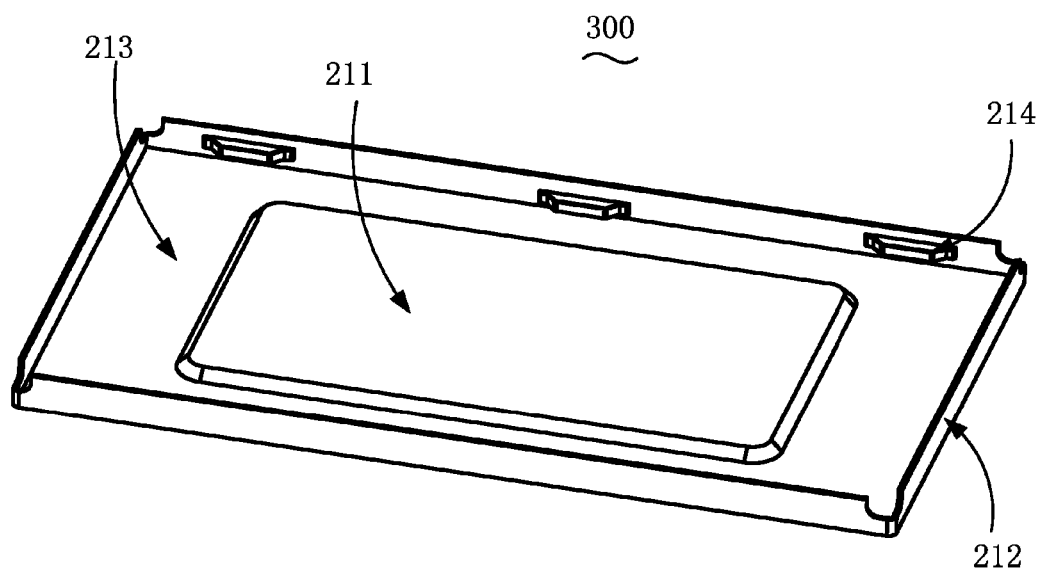
FIG. 3 is a schematic perspective view of a backplate shown in FIG. 2 in a preferred embodiment.
Figure 4:
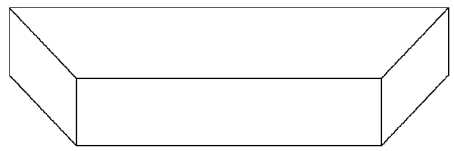
FIG. 4 is a schematic enlarged view of a first embodiment of a bridging structure shown in FIG. 2.
Figure 5:
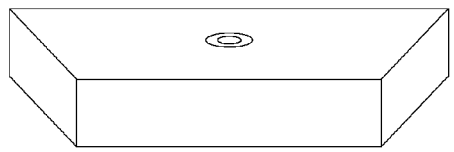
FIG. 5 is a schematic enlarged view of a second embodiment of the bridging structure shown in FIG. 2.
Figure 6:
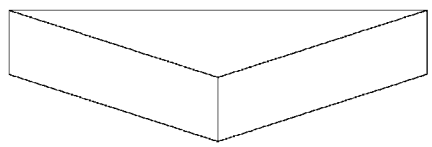
FIG. 6 is a schematic enlarged view of a third embodiment of the bridging structure shown in FIG. 2.
Figure 7:
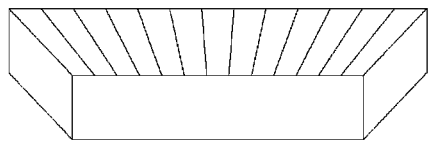
FIG. 7 is a schematic enlarged view of a fourth embodiment of the bridging structure shown in FIG. 2.
Figure 8:
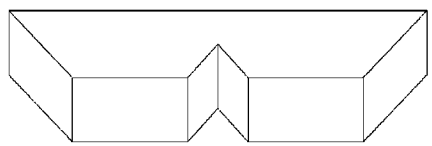
FIG. 8 is a schematic enlarged view of a fifth embodiment of the bridging structure shown in FIG. 2.

FIG. 3 is a schematic perspective view of a backplate shown in FIG. 2 in a preferred embodiment. As shown in FIG. 2 to FIG. 3, the backplate 210 comprises a baseplate 211, four side plates 212, and four connecting portions 213 which connect the baseplate 211 and a corresponding one of the side plates 212 respectively to form a receiving space for receiving the reflective sheet 220, the light guide plate 230 and the at least one light source 240. The baseplate 211 is designed to be at a higher level than a lower edge of each of the side plates 212, and the baseplate 211 and the side plates 212 are connected together by the connecting portions 213 disposed between the baseplate 211 and the side plates 212 respectively to form the aforesaid receiving space. Preferably, a distance between each of the side plates 212 and the baseplate 211 is equal. That is to say, each of the connecting portions 213 has the same size. Of course, as will be appreciated by people skilled in the art, the side plates 212 may also be designed to be directly connected with the baseplate 211.

As one embodiment of the present disclosure, the side plates 212 are disposed perpendicular to the baseplate 211 respectively, and the backplate 210 further comprises at least one bridging structure 214 extending inwards from an inner surface of the side plates 212 by a certain distance to support and locate the at least one light source 240 and the light guide plate 230. The at least one bridging structure 214 is a trapezoidal protrusion structure that protrudes outwards, and an upper surface of the at least one bridging structure 214 adjoining the one light source 240 and the light guide plate 230 is a planar surface and is within a same horizontal plane as an upper surface of the baseplate 211. Thereby, the baseplate 211, the at least one bridging structure 214, and the side plates 212 can accurately fix the positions of the at least one light source 240 and the light guide plate 230 so that alignment of the light source with the light guide plate is better ensured. This can improve the light coupling efficiency of the light source 240 and the light guide plate 230 and reduces the light loss.

FIG. 4 to FIG. 8 are schematic enlarged views of a first embodiment to a fifth embodiment of the bridging structure respectively. As shown in FIG. 4 to FIG. 8, the bridging structure 214 may be a polyhedral three-dimensional (3D) structure having different forms, and the upper surface thereof may be a rough surface. Further, the upper surface may be formed with micro-structures of various designs or with a groove structure recessed inwards at the fixing position of the light source to better fix the light source 240 and the light guide plate 230.

Furthermore, as will be appreciated by people skilled in the art, the present disclosure may also comprise a plurality of light sources 240, and a plurality of bridging structures 214 are disposed on the side plate 212 that faces a light incident surface (not labeled) of the light guide plate 230 to support the light sources 240 respectively. The light guide plate 230 of the present disclosure may also comprise a plurality of light incident surfaces (not labeled), and a plurality of bridging structures 214 are disposed on side plates 212 that face the light incident surfaces respectively. The bridging structures 214 are designed to match with the light incident characteristics of the light guide plate respectively to support and fix the light sources 240 at the corresponding positions respectively so that light rays emitted by the light sources 240 can enter the light guide plate 230 through the plurality of light incident surfaces of the light guide plate 230.

The light source 240 may be a point light source such as a light-emitting diode (LED) so that it can be supported by the bridging structure 214. In addition, as will be appreciated by people skilled in the art, the light source 240 may also be a line light source such as a code cathode fluorescent light (CCFL), in which case a plurality of (e.g., three or two) bridging structures 214 are used to support the light source 240 in order to ensure precise coupling of the light source 240 with the light guide plate 230.

Furthermore, the backlight module 200 may further comprise other kinds of optical films (e.g., a brightness enhancement film (BEF)) disposed on the light guide plate 230. The baseplate 211, the side plates 212, the connecting portions 213 and the bridging structure 214 of the backplate 210 may be integrally formed. The bridging structure 214 may also be moveably connected with the side plate 212 through plugging so as to flexibly and conveniently support different combinations of specific light guide plates and light sources having different characteristics.

According to the backlight module 200 of the present disclosure, at least one bridging structure 214 for supporting the light source 240 is disposed on the side plate(s) 212 of the backplate 210, so use of the heat dissipating aluminum extruded piece can be eliminated to reduce the cost; and furthermore, the at least one bridging structure 214 can be used to accurately fix the positions of the light source 240 and the light guide plate 230 relative to each other, so the light coupling efficiency is relatively high.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A backplate for use in a backlight module, comprising:
a baseplate for supporting a light guide plate;
four side plates, being disposed perpendicular to the baseplate respectively to form a receiving space for receiving the light guide plate; and
at least one bridging structure, extending inwards from an inner surface of the side plates by a certain distance, wherein the at least one bridging structure is movably connected with the side plates to support and locate at least one light source and the light guide plate, the at least one bridging structure is a polyhedral three-dimensional (3D) structure protruding outwards, and an upper surface of the at least one bridging structure adjoining the at least one light source and the light guide plate is a planar surface;
wherein the baseplate is at a higher level than a lower edge of each of the side plates, and an upper surface of the baseplate is within a same horizontal plane as the upper surface of the at least one bridging structure.

2. The backplate of claim 1, further comprising four connecting portions, each of which is disposed between the baseplate and a corresponding one of the side plates respectively to connect the baseplate and the corresponding one of the side plates.

3. The backplate of claim 2, wherein the baseplate, the connecting portions, the side plates and the at least one bridging structure are integrally formed.

4. A backplate for use in a backlight module, comprising:
a baseplate for supporting a light guide plate;
four side plates, being disposed perpendicular to the baseplate respectively to form a receiving space for receiving the light guide plate; and
at least one bridging structure, extending inwards from an inner surface of the side plates by a certain distance to support and locate at least one light source and the light guide plate;
wherein the at least one bridging structure is a polyhedral 3D structure protruding outwards, and an upper surface of the at least one bridging structure adjoining the at least one light source and the light guide plate is a planar surface;
wherein the baseplate is at a higher level than a lower edge of each of the side plates, and an upper surface of the baseplate is within a same horizontal plane as the upper surface of the at least one bridging structure.

5. The backplate of claim 4, further comprising four connecting portions, each of which is disposed between the baseplate and a corresponding one of the side plates respectively to connect the baseplate and the corresponding one of the side plates.

6. The backplate of claim 5, wherein the baseplate, the connecting portions, the side plates and the at least one bridging structure are integrally formed.

7. The backplate of claim 4, wherein the upper surface of the at least one bridging structure is a rough surface.

8. The backplate of claim 7, wherein the upper surface of the at least one bridging structure is formed with micro-structures or with groove structures recessed inwards to better fix the at least one light source and the light guide plate.

9. The backplate of claim 4, wherein the at least one bridging structure is movably connected with the side plates to support different combinations of specific light guide plates and light sources having different characteristics.

10. A backlight module, comprising:
a light guide plate;
at least one light source for providing light; and
a backplate, comprising:
a baseplate for supporting the light guide plate;
four side plates, being disposed perpendicular to the baseplate respectively to form a receiving space for receiving the light guide plate; and
at least one bridging structure, extending inwards from an inner surface of the side plates by a certain distance to support and locate the at least one light source and the light guide plate;
wherein the light guide plate comprises a plurality of light incident surfaces, the backlight module comprises a plurality of light sources, and the backplate comprises a plurality of bridging structures each of which is disposed on the side plates that directly face the light incident surfaces of the light guide plate to support the light sources respectively.

11. The backlight module of claim 10, wherein the at least one bridging structure is a polyhedral 3D structure protruding outwards, and an upper surface of the at least one bridging structure adjoining the at least one light source and the light guide plate is a planar surface.

12. The backlight module of claim 11, wherein the upper surface of the at least one bridging structure is a rough surface.

13. The backlight module of claim 12, wherein the upper surface of the at least one bridging structure is formed with micro-structures or with groove structures recessed inwards to better fix the at least one light source and the light guide plate.

14. The backlight module of claim 10, wherein the baseplate is at a higher level than a lower edge of each of the side plates, and an upper surface of the baseplate is within a same horizontal plane as the upper surface of the at least one bridging structure.

15. The backlight module of claim 14, wherein the backplate further comprises four connecting portions, each of which is disposed between the baseplate and a corresponding one of the side plates respectively to connect the baseplate and the corresponding one of the side plates.

* * * * *